United States Patent
Pieron et al.

(10) Patent No.: US 9,561,433 B1
(45) Date of Patent: Feb. 7, 2017

(54) PROVIDING EVENT REWARDS TO PLAYERS IN AN ONLINE GAME

(71) Applicant: KABAM, INC., San Francisco, CA (US)

(72) Inventors: Luc Pieron, San Francisco, CA (US); Henry Rull, Concord, CA (US); Kevin Simmons, Oakland, CA (US); Sam McLellan, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

(21) Appl. No.: 13/962,707

(22) Filed: Aug. 8, 2013

(51) Int. Cl.
*A63F 9/24* (2006.01)
*A63F 13/30* (2014.01)
*G07F 17/32* (2006.01)

(52) U.S. Cl.
CPC .......... *A63F 13/12* (2013.01); *G07F 17/3262* (2013.01); *G07F 17/3267* (2013.01)

(58) Field of Classification Search
None
See application file for complete search history.

(56) References Cited

U.S. PATENT DOCUMENTS

| | | |
|---|---|---|
| 5,816,918 A | 10/1998 | Kelly |
| 5,933,813 A | 8/1999 | Teicher |
| 5,964,660 A | 10/1999 | James |
| 6,142,472 A | 11/2000 | Kliebisch |
| 6,190,225 B1 | 2/2001 | Coleman |
| 6,402,619 B1 | 6/2002 | Sato |
| 6,561,904 B2 | 5/2003 | Locke |
| 6,604,008 B2 | 8/2003 | Chudley |
| 6,745,236 B1 | 6/2004 | Hawkins |
| 6,811,483 B1 | 11/2004 | Webb |
| 6,850,900 B1 | 2/2005 | Hare |
| 6,928,474 B2 | 8/2005 | Venkatesan |
| 7,076,453 B2 | 7/2006 | Jammes |

(Continued)

FOREIGN PATENT DOCUMENTS

| | | |
|---|---|---|
| KR | 1020130137431 | 12/2013 |
| WO | 0226333 | 1/2002 |

(Continued)

OTHER PUBLICATIONS

'Quest item—WoWWiki—Your guide to the World of Warcraft', printed from http://www.wowwiki.com/Quest_Item, Retrieved on Apr. 16, 2014, 1 page.

(Continued)

*Primary Examiner* — Jason Yen
(74) *Attorney, Agent, or Firm* — Sheppard Mullin Richter & Hampton LLP (57) ABSTRACT

A system and method for providing event rewards within an online game are disclosed. A secondary game may be provided to facilitate players to win awards provided by the secondary game. The secondary game may be exclusive to players who achieve ranks in an event at the end of event period. Individual rewards may be determined based on such player ranks. The individual rewards may include a quantity of free turns to play the secondary game, a quantity of optional turns to play the secondary game in exchange for consideration from the ranked players and/or other reward features. Notification may be presented to the ranked players notifying the optional turns must be acquired by the players before a point of time or else they will be offered to lower ranked players.

18 Claims, 4 Drawing Sheets

(56) References Cited

U.S. PATENT DOCUMENTS

| | | |
|---|---|---|
| 7,381,133 B2 | 6/2008 | Thomas |
| 7,455,586 B2 * | 11/2008 | Nguyen et al. ............... 463/16 |
| 7,533,336 B2 | 5/2009 | Jaffe |
| 7,660,740 B2 | 2/2010 | Boone |
| 7,682,239 B2 | 3/2010 | Friedman |
| 7,785,188 B2 | 8/2010 | Cannon |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,157,635 B2 | 4/2012 | Hardy |
| 8,187,101 B2 | 5/2012 | Herrmann |
| 8,226,472 B2 | 7/2012 | Van Luchene |
| 8,239,487 B1 | 8/2012 | Hoffman et al. ............ 709/218 |
| 8,272,956 B2 | 9/2012 | Kelly |
| 8,282,491 B2 | 10/2012 | Auterio |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,601 B1 | 11/2012 | Luciano, Jr. |
| 8,332,260 B1 | 12/2012 | Mysen |
| 8,348,716 B2 | 1/2013 | Ganz |
| 8,348,767 B2 | 1/2013 | Mahajan |
| 8,360,858 B2 | 1/2013 | LaRocca |
| 8,360,867 B2 | 1/2013 | VanLuchene |
| 8,366,544 B2 | 2/2013 | Walker |
| 8,371,925 B2 | 2/2013 | Bonney |
| 8,376,826 B2 | 2/2013 | Katz |
| 8,401,913 B2 | 3/2013 | Alivandi |
| 8,439,759 B1 | 5/2013 | Mello |
| 8,512,150 B2 | 8/2013 | Herrmann |
| 8,636,591 B1 | 1/2014 | Hawk |
| 8,777,754 B1 | 7/2014 | Santini |
| 8,790,185 B1 | 7/2014 | Caldarone |
| 8,821,260 B1 | 9/2014 | DeSanti |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,138,639 B1 | 9/2015 | Ernst |
| 9,257,007 B2 | 2/2016 | Santini |
| 2002/0059397 A1 | 5/2002 | Feola |
| 2002/0072412 A1 | 6/2002 | Young |
| 2002/0095327 A1 | 7/2002 | Zumel |
| 2002/0165794 A1 | 11/2002 | Ishihara |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 * | 6/2003 | Chudley et al. ............... 463/23 |
| 2003/0157978 A1 * | 8/2003 | Englman ............ G07F 17/3244 463/16 |
| 2003/0174178 A1 | 9/2003 | Hodges |
| 2003/0216167 A1 | 11/2003 | Gauselmann |
| 2004/0002387 A1 | 1/2004 | Grady |
| 2004/0068451 A1 | 4/2004 | Lenk |
| 2004/0215524 A1 | 10/2004 | Parkyn |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0063587 A1 | 3/2006 | Manzo |
| 2006/0116196 A1 | 6/2006 | Vancura |
| 2006/0155597 A1 * | 7/2006 | Gleason ............... G06Q 30/02 705/14.12 |
| 2006/0200370 A1 | 9/2006 | Ratliff |
| 2006/0287029 A1 | 12/2006 | Yoshinobu |
| 2007/0077988 A1 | 4/2007 | Friedman |
| 2007/0129139 A1 | 6/2007 | Nguyen |
| 2007/0281285 A1 | 12/2007 | Jayaweera |
| 2008/0032787 A1 | 2/2008 | Low |
| 2008/0058092 A1 | 3/2008 | Schwartz |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0194318 A1 | 8/2008 | Kralicky |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0275786 A1 | 11/2008 | Gluck |
| 2008/0300045 A1 | 12/2008 | Ratcliff ............... 463/25 |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0124353 A1 | 5/2009 | Collette |
| 2009/0204907 A1 | 8/2009 | Finn |
| 2009/0210301 A1 | 8/2009 | Porter |
| 2009/0234710 A1 | 9/2009 | Belgaied Hassine |
| 2010/0035689 A1 | 2/2010 | Altshuler |
| 2010/0041472 A1 | 2/2010 | Gagner |
| 2010/0050088 A1 | 2/2010 | Neustaedter |
| 2010/0094841 A1 | 4/2010 | Bardwil |
| 2010/0174593 A1 | 7/2010 | Cao |
| 2010/0198653 A1 | 8/2010 | Bromenshenkel |
| 2010/0227675 A1 | 9/2010 | Luxton |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2011/0092271 A1 * | 4/2011 | Nguyen ............ G07F 17/3244 463/25 |
| 2011/0092273 A1 | 4/2011 | Cerbini |
| 2011/0113353 A1 | 5/2011 | Koh |
| 2011/0145040 A1 | 6/2011 | Zahn |
| 2011/0151957 A1 * | 6/2011 | Falciglia, Sr. ............ 463/18 |
| 2011/0218033 A1 | 9/2011 | Englman |
| 2011/0263324 A1 | 10/2011 | Ganetakos |
| 2011/0275438 A9 | 11/2011 | Hardy et al. ............... 463/42 |
| 2011/0281638 A1 | 11/2011 | Bansi |
| 2011/0282764 A1 | 11/2011 | Borst |
| 2011/0300923 A1 | 12/2011 | Van Luchene |
| 2011/0319152 A1 | 12/2011 | Ross |
| 2012/0011002 A1 | 1/2012 | Crowe |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0101886 A1 | 4/2012 | Subramanian |
| 2012/0108306 A1 * | 5/2012 | Munsell ............ A63F 13/10 463/9 |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0157193 A1 | 6/2012 | Arezina |
| 2012/0166380 A1 | 6/2012 | Sridharan |
| 2012/0178515 A1 | 7/2012 | Adams et al. ............... 463/17 |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1 | 8/2012 | Ganz |
| 2012/0221430 A1 | 8/2012 | Naghmouchi |
| 2012/0231891 A1 | 9/2012 | Watkins |
| 2012/0244945 A1 | 9/2012 | Kolo |
| 2012/0244950 A1 * | 9/2012 | Braun ............ 463/42 |
| 2012/0245988 A1 | 9/2012 | Pace |

(56) References Cited

U.S. PATENT DOCUMENTS

| | | | |
|---|---|---|---|
| 2012/0289315 A1 | 11/2012 | Van Luchene | |
| 2012/0289330 A1* | 11/2012 | Leydon | G07F 17/3255 463/31 |
| 2012/0289346 A1 | 11/2012 | Van Luchene | |
| 2012/0295699 A1 | 11/2012 | Reiche | |
| 2012/0296716 A1 | 11/2012 | Barbeau | |
| 2012/0302329 A1 | 11/2012 | Katz | |
| 2012/0309504 A1 | 12/2012 | Isozaki | |
| 2012/0311504 A1 | 12/2012 | vanOs | |
| 2013/0005437 A1 | 1/2013 | Bethke | |
| 2013/0005466 A1 | 1/2013 | Mahajan | |
| 2013/0005473 A1 | 1/2013 | Bethke | |
| 2013/0005480 A1 | 1/2013 | Bethke | |
| 2013/0006736 A1 | 1/2013 | Bethke | |
| 2013/0012304 A1 | 1/2013 | Cartwright | |
| 2013/0013459 A1 | 1/2013 | Kerr | |
| 2013/0072278 A1 | 3/2013 | Salazar | |
| 2013/0079087 A1* | 3/2013 | Brosnan et al. | 463/16 |
| 2013/0090173 A1 | 4/2013 | Kislyi | |
| 2013/0095914 A1 | 4/2013 | Allen | |
| 2013/0124361 A1 | 5/2013 | Bryson | |
| 2013/0173393 A1 | 7/2013 | Calman | |
| 2013/0210511 A1 | 8/2013 | LaRocca | |
| 2013/0217489 A1 | 8/2013 | Bendayan | |
| 2013/0226733 A1 | 8/2013 | Evans | |
| 2013/0244767 A1 | 9/2013 | Barclay | |
| 2013/0288757 A1 | 10/2013 | Guthridge | |
| 2013/0290147 A1 | 10/2013 | Chandra | |
| 2013/0303726 A1 | 11/2013 | Mozzarelli | |
| 2013/0310164 A1 | 11/2013 | Walker | |
| 2014/0004884 A1* | 1/2014 | Chang | H04W 4/025 455/456.3 |
| 2014/0033262 A1 | 1/2014 | Anders | |
| 2014/0038679 A1 | 2/2014 | Snow | |
| 2014/0067526 A1 | 3/2014 | Raju | |
| 2014/0067544 A1 | 3/2014 | Klish | |
| 2014/0073436 A1 | 3/2014 | Takagi | |
| 2014/0087864 A1 | 3/2014 | Togashi | |
| 2014/0089048 A1 | 3/2014 | Bruich | |
| 2014/0100020 A1 | 4/2014 | Carroll | |
| 2014/0128137 A1* | 5/2014 | Balise, III | 463/10 |
| 2014/0157314 A1 | 6/2014 | Roberts | |
| 2014/0206452 A1 | 7/2014 | Bambino | |
| 2014/0243072 A1 | 8/2014 | Santini | |
| 2014/0274359 A1 | 9/2014 | Helava | |
| 2014/0295958 A1 | 10/2014 | Shono | |
| 2014/0329585 A1 | 11/2014 | Santini | |
| 2014/0337259 A1 | 11/2014 | Lamb | |
| 2015/0019349 A1 | 1/2015 | Milley | |
| 2015/0031440 A1 | 1/2015 | Desanti | |
| 2015/0306494 A1 | 10/2015 | Pieron | |
| 2015/0335995 A1 | 11/2015 | McLellan | |
| 2015/0352436 A1 | 12/2015 | Pieron | |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

"Cataclysm Guide: Guild Advancement—Wowhead", http://www.wowhead.com/guide=cataclysm&guilds, printed Dec. 5, 2013, 4 pages.
"Guild Housing System—FlyFF Wiki", http://flyff-wiki.gpotato.com/wiki/Guild_Housing_System, printed Dec. 5, 2013, 5 pages.
"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.
"Rest—WoWWiki—Your guide to the World of Warcraft", printed from http://www.wowwiki.com/Rest, May 19, 2014, 2 pages.
Super Mario Bros. 3, NES Gameplay, http://www.youtube.com/watch?v=82TL-Acm4ts, 1 page.
Super Mario Bros. 3, StrategyWiki, the video game walkthrough and strategy guide, http://strategywiki.org/wiki/Super_Mario_Bros._3, 4 pages.
Super Mario Bros. 3 Review, Nintendo for NES, Feb. 1990, pp. 1-4.
TFF Challenge—UC Davis, http://tffchallenge.com/team/uc-davis/, printed Jan. 15, 2014, 12 pages.
"Building Structures". War2.warcraft.org. Online. Accessed via the Internet. Accessed Aug. 9, 2014. <URL: http://war2.warcraft.org/strategy/verybasics/building.shtml>, 3 pages.
"Clash of Clans". Wikipedia.org. Online. Accessed via the Internet. Accessed Aug. 9, 2014. <URL: http://en.wikipedia.org/wiki/Clash of Clans>, 3 pages.
"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.
"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.
"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
City Coins. CityVille Wikia. Online. Accessed via the Internet. Accessed Aug. 9, 2014. <URL: http://cityville.wikia.com/wiki/City_Coins>, 2 pages.
"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.
"Behavioural Analytics & Campaigning", http://lotaris.com/behavioural._analytics_and._Campaigning.htm, screenshot access date May 24, 2012 2:21 PM, 1 page.
"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco , Mar. 27, 2012 (Business Wire), 8:30 a.m. EDT, printed May 24, 2012 2:32 PM, 3 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.
MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

(56) References Cited

OTHER PUBLICATIONS

TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online", available on Sep. 9, 2011, https://web.archive.org/web/20110927210155/http://en.wikipedia.org/wiki/Gaia_Online, 8 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
<http://lotro-wiki.com/index.php?title=Ouest:A_Little_Extra_Never_Hurts_--_Part_2&oldid=399366>, <http://lotrowiki.com/index.php ?title=Getting_Started&oldid=349681 >. Links are to used articles. (7 pgs) Feb. 26, 2014.
"Lotro-Wiki.com" (evidence in regards to "Lord of the Rings Oline" MMORPG game),latest Dec. 22, 2011,<http://lotrowiki.com/index.php/Main_Page>(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).
Diablo 2, Blizzard Entertainment, Mar. 23, 2009, manual and online website, http://web.archive.Org/web/20090323171356/http://classic.battle.net/diablo 2exp/items/basics.shtml, 51 pages.
Dreamslayer's Enchanting and Upgrading Guide—With Pictures:D and Explanations, URL: forums.elswordonline.com/Topic5673.aspx [Retrieved Feb. 21, 2013], 10 pages.
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
Gem System—Street Fighter X Tekken, http://www.streetfighter.com/us/sfxtk/features/gem-system, printed Nov. 6, 2012, 6 pages.
MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00Ffv, Sep. 28, 2012, 12 pages.
MapleStory—Guides—Equipment Upgrading 101: Potentials, URL: maplestory.nexon.net/guides/game-play/systems/OOFlj/ [Retrieved Jun. 24, 2013], 5 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
Path of Exile, Internet posting: http://web.archive.org/web/20120606004658/http://www.pathofexile.com/forum/view-thread/12056, Nov. 16, 2011, 52 pages.
Profession—WoWWiki—Your guide to the World of Warcraft, URL: http://www.wowwiki.com/Profession, printed Nov. 6, 2012, 8 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
MapleStory—Guides—Equipment Upgrading 101: Enhancements, URL: maplestory.nexon.net/guides/game-play/systems/OOFlk; [Retrieved Jun. 24, 2013] 3 pages.
Elsword—Wikipedia, the free encyclopedia, URL: en.wikipedia.org/wiki/Elsword [Retrieved Feb. 21, 2013], 6 pages.
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
Wikipedia, Mafia Wars, <http://en.wikipedia.org/wiki/Mafia_Wars>, Jan. 28, 2012, 3 pages.
New Feature: Tiered Tournaments and Tournament Updates, printed from http://community.kabam.com/forums/showthread.php?171349-New-Feat on Feb. 11, 2014, 2 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.

\* cited by examiner

PROVIDING EVENT REWARDS TO PLAYERS IN AN ONLINE GAME

FIELD OF THE DISCLOSURE

This disclosure relates to facilitating events within an online game, the events being facilitated by providing rewards to the players who participated in the events based on ranks achieved by those players at the end of the events.

BACKGROUND

Systems that provide tournaments within online games hosted by those systems are known. In those systems, players of the online games typically compete against each other individually or in teams to win prizes. The prizes provided by the tournaments are typically predetermined by providers or moderators of those systems, and announced to the players before the commencement of the tournaments. In order to win such prizes, some players may spend virtual currency and/or real currency to acquire virtual items, equipment, privileged abilities and/or skills, magic power and the like before and/or during the tournaments for advantages in the tournaments. However, these players typically stop such spending after they complete the tournaments.

SUMMARY

One aspect of the disclosure relates to providing rewards to players who participate in events within an online game. A secondary game may be provided in the online game to players who achieve certain ranks in an event in the online game. The secondary game may facilitate those players to take turns to win potential awards provided by the secondary game, which may include premium virtual items highly sought after within the online game, virtual items that may augment and/or enhance items rewarded by the events, and/or any other awards provided by the secondary game. In some examples, the secondary game may include a simulated game of chance. The events may be run in the online game for event periods. At the end of an event period of an event, ranks of players who participate in the event may be determined based on one or more changes in the player parameters during the event period. Rewards may be provided to those players for achieving the ranks at the end of the event period. Such a reward may include a quantity of turns for the given player to play the secondary game for free, a quantity of optional turns for the given user to play the secondary game in exchange for consideration from the given player, and/or any other reward features. In some implementations, the consideration may include virtual currency and/or real currency from the given player. In some examples, the given player may be notified that the quantity of optional turns to play the secondary game as included in the reward must be acquired before a point of time, e.g., the commencement of the secondary game or else such turns will be provided to players who achieve lower ranks at the end of the event period. This may enhance monetization opportunities for the provider of the online game as players may be motivated to spend after they have completed the event.

A system configured for may include a server. The server may operate in a client/server architecture with one or more client computing platforms. The client computing platforms may be associated with the players of the online game. The server may be configured to execute one or more of a game module, a user module, a secondary game module, an event module, a reward module and/or other modules.

The game module may be configured to execute an instance of the online game in which an online game takes place. The players may interact with online game elements and/or with each other through gameplays provided by the online game. The gameplays may include role-playing, first-person shooter, real-time strategy, turn-based strategy, simulation, music and/or rhythm playing, social interaction, twitching and/or any other gameplays. The players may participate in the instance of the online game by inputting commands to initiate user actions for controlling one or more of online game elements. Upon receiving the user commands initiating the user actions, the space module may be configured to execute the user actions.

The user module may be configured to access and/or manage one or more player accounts associated with individual players of the system. The one or more player accounts may contain player parameters associated with the individual players. The set of parameters may include parameters reflecting the individual players progression in the online game, parameters indicating various statistics about virtual resources that have been amassed by the players in the online game, parameters indicating various statistics about the players' performance in competitions, parameters indicating various statistics about relationships achieved by the given player in and/or outside of the online game, and/or any other player parameters. The player accounts managed by the user module may include a first player account associated with a first player in the online game. The first player account may include a first set of player parameters associated with the first player within the online game.

The secondary game module may be configured to selectively provide access to the players of a secondary game to facilitate player turns to engage in gameplay provided by the secondary game. The secondary game facilitated by the secondary game module may be exclusive such that it is not accessible to general public of the online game, and is accessible only to the players invited, e.g., via the reward module. For executing individual turns of the secondary game, the secondary game module may be configured to obtain a set of potential awards to be provided by the secondary game and a set of award probabilities associated with individual ones of the potential awards in the set. Such potential awards may include premium items highly sought after in the online game, items that may be used to augment and/or enhance other items, such as items rewarded by the events within the online game, improvements to one or more player parameters described above, virtual services (e.g., enhanced graphics of the online game), and/or any other awards that may be provided through the secondary game. In some examples, the potential awards of the secondary game may be dynamically determined based one or more items rewarded by events in the online game as determined by the reward module.

In an individual turn of the secondary game, a given player may engage in the gameplay provided by the secondary game to win one or more of the potential awards. For determining an outcome of the individual turn of the secondary game, the secondary game module may be configured to stochastically or quasi-stochastically select one of the potential awards as an actual award or actual rewards for distribution to the given player as a result of the gameplay engaged in by the given player based on the award probabilities associated with the individual ones of the potential awards. In some examples, the gameplay provided by the secondary game may include chance-based gameplay, such as dice, wheel spinning, roulette, spinning tops, card drawing, lottery, and/or any other chance-based gameplays.

The event module may be configured to run events to facilitate players to compete against each other and/or against AI entities individually or in teams during event periods within the online game. The events run by the event module may comprise one or more event objectives. The event objectives may include one or more of player objectives, player-versus-player objectives, player-versus-environment objectives, and collecting and/or harvesting objectives. Player objectives may specify one or more changes in one or more player parameters during event period. In some examples, the event objectives for a given event may be competitive such that the players participating in the given event are incentivized to achieve the event objectives in ways that will defeat other participating players. For example, the players may be incentivized to achieve highest, second highest and so on number of kills in the given event, number of victories in PvP activities facilitated by the event, highest amount of virtual resources during the event period of the given event and/or any other competitive event objective that may be measured statistically through the player parameters associated with the participating players. For so incentivizing the players, reward schemes, e.g., such as the rewards determined by the reward module may be announced to the players prior to the commencement of the given event.

At the end of the given event, the event module may be configured to rank the players who participated in the event based on ranking criteria. The ranking criteria may include ranking the participating players based on changes in one or more of the player parameters associated with those players during the event period of the given event. Such changes may include the participating players' progression in the online game during the event period, a quantity of resources amassed by the individual players during the event period, a number of competition victories achieved by the players during the event period, a number of relationships established by the individual players within and/or outside of the online game during the event period, a number of virtual items acquired by the individual players during the event period and/or any other achievements by the players in accordance with the competitive event objectives described above. For example, in one exemplary event wherein ranking criteria is number of dragon kills, a player with the greatest number of dragon kills at the end of event period may appear higher in the event ranking than a player with less number of dragon kills.

The reward module may be configured to determine rewards for the players participating in the events run by the event module based on the ranks achieved by the players as determined by the event module. In some examples, this may involve dynamically determining for a given player for achieving a given rank at the end of the event period a reward based on the given rank. In some examples, the reward determined by the reward module may be in accordance with one or more reward tables, conversion tables, and/or any other reward schemes predetermined by the provider, administrator, moderator, and/or any other entities related to the online game. In some examples, the reward module may be configured to facilitate notification of the reward schemes for a given event prior to the commencement of the given event.

An individual reward determined by the reward module for a given player for achieving a given rank in an event as determined by the event module may include a quantity of turns for the given player to play the secondary game for free. In some examples, such quantity of free turns may be determined by the reward module based on the given rank achieved by the given player at the end of the event.

An individual reward determined by the reward module for the given player for achieving a given rank in an event as determined by the event module may include a quantity of optional turns for the given player to play the secondary game in exchange for consideration from the given player. The consideration may include virtual currency, real-world currency, virtual items, play sessions, and/or any other consideration from the given player. For example, the reward for the given user may include a quantity of optional turns to play the secondary game in exchange for certain amount of real-world currency from the given player. In some examples, the reward module may determine a point of time by which the given player must acquire the optional turns included in the reward. A notification about such a point of time may be communicated to the given player before that point of time. The notification may provide that if the given player does not acquire the optional turns to play the secondary game as included in the reward by that point of time, the optional turns will be offered to another player who ranks lower than the given player in the event at the end of the event period in exchange for consideration from that player.

In some examples, features of individual turns rewarded to the players may be determined by the reward module. In one example, such features may include the turns (i.e., the free and/or optional turns) rewarded to higher ranked players may have higher priorities for playing the secondary game than those rewarded to lower ranked players.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
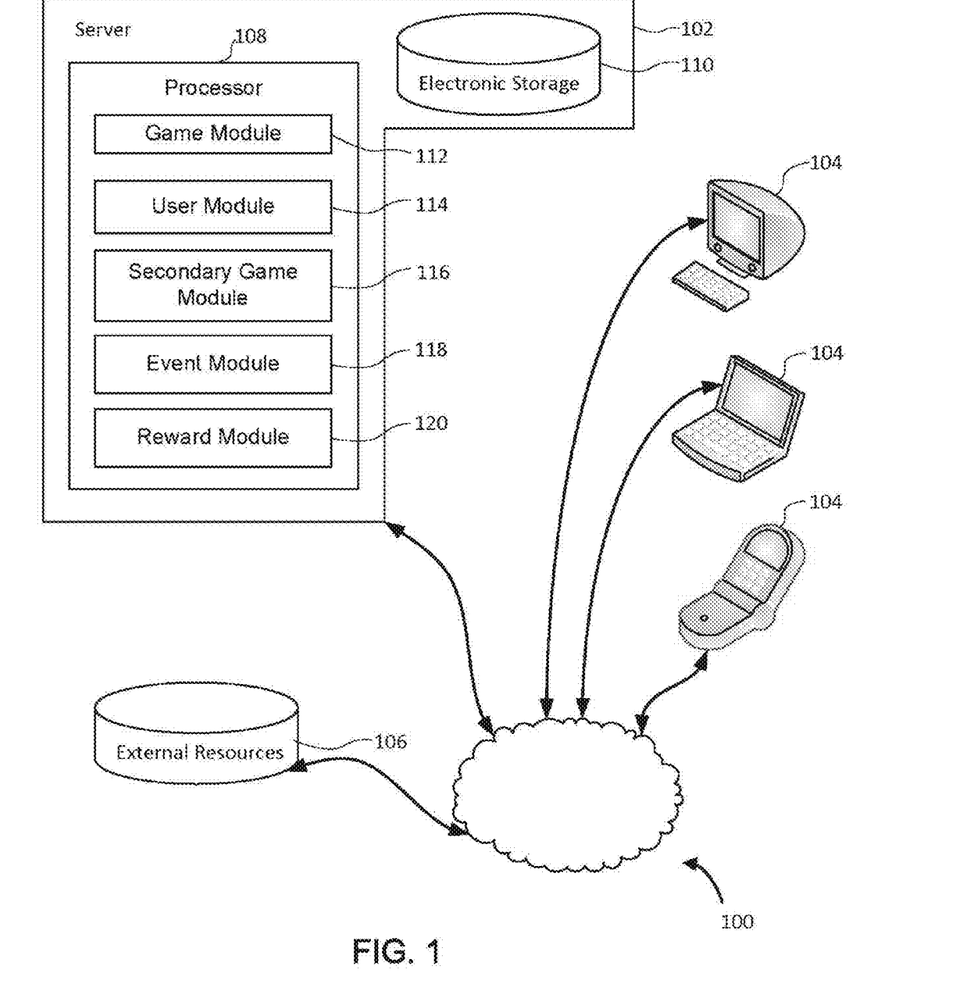
FIG. 1 illustrates one example of a system for providing event rewards within an online game in accordance with the disclosure.

FIG. 1 illustrates a system 100 for providing event rewards within an online game. Providing the online game/environment may include hosting the online game/environment over a network. Providing the online game may include hosting the online game over a network. The players may access system 100 and/or the online game via client computing platforms 104.

In some implementations, system 100 may include a server 102. The server 102 may be configured to communicate with one or more client computing platforms 104 according to a client/server architecture. The players may access system 100 and/or the online game via client computing platforms 104. The computer program modules may include one or more of a game module 112, user module 114, secondary game module 116, event module 118, reward module 120 and/or other modules.

The game module 112 may be configured to execute an instance of the online game in which an online game takes place. Within the instance of the online game, the players may participate in the online game to experience gameplays provided by the online game. The gameplays may include role-playing, first-person shooter, real-time strategy, turn-based strategy, simulation, music or rhythm playing, social interaction, twitching and/or any other gameplays. For facilitating the user participation in the online game, the game module 112 may be configured to determine states of the online game communicated (e.g., via streaming visual data, via object/position data, and/or other state information) from server 102 to client computing platforms 104 for presentation to players. A given online game state determined and transmitted to a given client computing platform 104 may correspond to a view for a user character being controlled by a user via the given client computing platform 104 at a point of time in the online game. The given state determined and transmitted to a given client computing platform 104 may correspond to a location in the online game. The view described by the given state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the online game may comprise a simulated space that is accessible by players via clients (e.g., client computing platforms 104) that present the views of the online game to a user. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the online game may comprise automatically controlled entities not associated with any user. As such, the automatically controlled online game entities may be generated, controlled, evolved, customized, developed and/or otherwise provided by artificial intelligence configured into the server 102 by a provider, administrator, moderator, and/or any other entities related to the online game. Such automatically controlled entities may interact with entities controlled by or associated with the players, other automatically controlled entities and as well as the topography of the online game. Certain traits, attributes and/or characteristics may be manifested by, possessed by and/or otherwise associated with the automatically controlled entities and evolved in the online game in accordance with the artificial intelligence. As an illustration, such evolving characteristics of the automatically controlled online game entities may include skills, abilities, powers, strength, stamina, physical appearances such as age, attire, facial expression, speech style and pattern, response style in reaction to user's interaction, gesture and/or any other traits. Examples of the automatically controlled entities in the online game may include characters, objects, components of the topography, phenomena (e.g., rains, storms, snow), and/or any other automatically controlled elements within the online game. As used herein, such automatically controlled entities in the instance of the online game are referred to as "AI entities".

The above description of the manner in which state of the online game is determined by game module 112 is not intended to be limiting. The game module 112 may be configured to express the online game in a more limited, or richer, manner. For example, views determined for the online game representing the state of the instance of the online game may be selected from a limited set of graphics depicting an event in a given place within the online game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the online game are contemplated.

Within the instance(s) of the online game executed by game module 112, the players may participate in the instance of the online game by controlling one or more of an element in the online game. The user controlled elements may include user controlled entities such as avatars, characters, units (e.g., troops) and/or any other user controlled entities, user controlled objects such as weaponry, vehicle, artillery, medicine, decorative items and/or other user controlled online game objects, simulated physical phenomena such as wind, rain, earthquakes, and/or other phenomena, and/or other user controlled elements. The user controlled avatars may represent the players in the online game. The user controlled characters (herein referred to as "user characters") may include heroes, knights, commanders, leaders, generals and/or any other individualized characters that may be trained, recruited, captured, and/or otherwise acquired by the players. The online game units controlled by the user may include troops, armies, cohorts, and/or any other online game entities that may be trained, recruited, captured, and/or otherwise acquired by the players in groups or en mass. Unlike user characters, individual members of an online game unit controlled by a given user may not be individualized (e.g., individual soldiers may share attributes associated with the troop they are members of).

In any case, the user controlled elements may move through and interact with AI entities, elements controlled by other players and/or topography in the online game. The elements controlled by a given user may be created and/or customized by the given user. The given user may have an "inventory" of virtual goods and/or currency that the given user can use (e.g., by manipulation of a user character or other user controlled elements, and/or other items) within the online game.

Controls to the online game may be exercised through commands input by the players through client computing platforms 104. The players may interact with each other through communications exchanged within the online game. Such communications may include one or more of textual chat, instant messages, private messages, voice communications, and/or other communications. Communications may be received and entered by the players via their respective client computing platforms 104. Communications may be routed to and from the appropriate players through server 102 (e.g., through game module 112).

A given user may input commands with specific parameters through a client computing platform 104 associated with the given user to initiate user actions or sphere of actions, to undertake specific deeds, to perform functions and/or initiate any other types of interactions within the online game or with other players. For example, the given user may input commands to construct, upgrade and/or demolish virtual buildings, harvest and/or gather virtual resources, heal virtual user controlled elements, AI entities and/or elements controlled by other players, train, march, transport, reinforce, reassign, recruit, and/or arrange troops, attack, manage, create, demolish and/or defend cities, realms, kingdoms, and/or any other online game locations controlled by or associated with the players, craft or transport virtual items, interact with, compete against or along with AI entities and/or online game elements controlled by other players in combats, research technologies and/or skills, mine and/or prospect for virtual resources, complete missions, quests, and/or campaigns, exercise magic power and/or cast spells, and/or perform any other specific deeds, actions, functions, or sphere of actions within the online game. In some examples, the given user may input commands to compete against elements in an environment within the online game—i.e., PvE activities. In some examples, the given user may input commands to compete against each other within the online game—i.e., PvP activities.

The game module 112 may be configured to execute user actions to facilitate interaction of the players with the online game and/or each other in response to receiving online game commands input by the players. Execution of the user actions by the game module 112 may produce changes to the online game state, which may reflect progresses and/or results of the user actions. In some examples, state changes caused by the execution of the user actions may be recorded in the electronic storage 122 to facilitate persistency throughout the instance of the game space. In some examples, execution of the user actions may not produce persistent changes to the online game state (e.g., a user character jumping forward and backward successively may not produce any perceivable game state changes to other players).

The instance the online game executed by the game module 112 may include complete activities of a given player within the online game, from the very first action when the given player joins the online game for the first time to the last action before the given player stops participating in the online game for good. The given player may undertake the complete activities (directly or indirectly) through different play sessions. That is, the time for the given player to undertake the complete activities within the online game may be divided into several different occasions—i.e., different play sessions. In some examples, a play session may start from when the given player logs into and finish when the given player logs off system 100 in one occurrence. However, this is not necessary the only case. A player session may be determined by provider, administrator, moderator, and/or any other entities related to the online game in however measurements as desired. For example, in some instances, a play session may be measured by frequencies of user participation in activities within the online game such that a play session finishes when the user stops participating the activities for a period of time over a predetermined threshold.

The user module 114 may be configured to access and/or manage one or more player accounts associated with individual players of the system 100. The one or more player accounts may be stored by server 102, one or more of the client computing platforms 104, and/or other storage locations. The one or more player accounts may contain player parameters associated with the individual players. For a given player, the player account associated with the given player may include a set of player parameters associated with the given player. The set of parameters may include parameters reflecting the given player progression in the online game, such as, but not limited to, experience points, skills acquired, strength level, magic powers acquired, technologies achieved, wonders built, numbers and types of enemies killed, quest completed, and/or any other player parameters that may reflect the given player progression in the online game. The set of parameters associated with the given players may include resource parameters that indicate various statistics about virtual resources that have been amassed by the given player in the online game, such as, but not limited to, types of resources, quantities of the resources, time when the resources are amassed, locations where the resources are amassed, and/or any other resource parameters. The set of player parameters associated with the given player may include parameters indicating various statistics about the player performance in competitions, such as PvP and PvE activities, such as but not limited to, types of the competitions engaged in by the given players, number of such competitions, number of victories achieved by the given in such competitions, and/or any other parameters indicating the given player performance in such competitions. The set of parameters associated with the given user may include parameters indicating various statistics about relationships achieved by the given player in and/or outside of the online game, such as, but not limited to, a number of friends connected, a number of opponents made, a number and types of alliances participated in, score quantifying reputation of the given player within the online game, and/or any other parameters regarding relationships achieved by the given player in and/or outside of the online game. It should be understood that the above examples of player parameters that may be contained in individual player accounts are merely illustrative, and thus are not intended to be limiting.

The player accounts managed by the user module 114 may include, for example, information identifying players (e.g., a username or handle, a number, an identifier, and/or other identifying information) within the online game, security login information (e.g., a login code or password), online game account information, subscription information, virtual currency account information (e.g., related to currency held in credit for a user), relationship information (e.g., information related to relationships between players in the online game), online game usage information, demographic information associated with players, interaction history among players in the online game, information stated by players, purchase information of players, browsing history of players, a client computing platform identification associated with a user, a phone number associated with a user, and/or other information related to players.

The player accounts managed by the user module 114 may include player information associated with individual players. Such player information may include information indicating levels of interaction with the online game by individual players. The interaction level of an individual player as indicated in such information may reflect an amount of interaction with the online game by the individual player. The player information may indicate inventories available to the individual players in the online game. An inventory associated with a given user may list virtual items, virtual resources, online game elements associated with the given user or under control of the given player and/or any other online game components of the given player at a time of inventory inquiry.

The secondary game module 116 may be configured to selectively provide access to the players of a secondary game to facilitate player turns the secondary game. The secondary game facilitated by the secondary game module 116 may be exclusive such that it is not accessible to general public of the online game, and is accessible to only those players invited, e.g., by the provider, administrator, moderator, and/or any other administrative entities related to online game (e.g., via the reward module 120). Within such a secondary game, the participating players may take turns to engage in gameplays provided by the secondary game. In some examples, the secondary game may have a finite number of turns of gameplays as determined by the provider, administrator, moderator, and/or any other administrative entities related to the online game. In some examples, the secondary game facilitated by the secondary game module 116 may be open ended until the provider, administrator, moderator, and/or any other administrative entities related to online determines to stop the secondary game.

In any case, for executing individual turns of the secondary game, the secondary game module 118 may be configured to obtain a set of potential awards to be provided by the secondary game and a set of award probabilities associated with individual ones of the potential awards in the set. Such potential awards may include premium items highly sought after in the online game, items that may be used to augment and/or enhance other items, such as items rewarded by the events within the online game, improvements to one or more player parameters, virtual services (e.g., enhanced graphics of the online game provided to the players), and/or any other awards that may be provided through the secondary game. The individual potential awards for the secondary game may be predetermined by the provider, administrator, moderator, and/or any other entities related to the online game at a configuration stage of the system. Simultaneously or alternatively, the individual potential awards may be determined dynamically during the instance of the online by the provider, administrator, moderator, and/or any other entities related to online game. In some examples, the potential awards of the secondary game may be dynamically determined based on one or more items rewarded by events in the online game as determined by the reward module 120.

In an individual turn of the secondary game, a given player may engage in the gameplay provided by the secondary game to win one or more of the potential awards. For determining an outcome of the individual turn of the secondary game, the secondary game module 116 may be configured to stochastically or quasi-stochastically select one of the potential awards as an actual award for distribution to the given player as a result of the gameplay engaged in by the given player based on the award probabilities with the individual ones of the potential awards. In some examples, the gameplay provided by the secondary game may include chance-based gameplay, such as dice, wheel spinning, roulette, spinning tops, card drawing, lottery, and/or any other chance-based gameplays. By way of a non-limiting example, in one instance, the secondary game may include a wheel spin gameplay, wherein for an individual turn, a player may spin the wheel (as simulated by the secondary game module 116) to win potential awards provided by the secondary game. In that instance, to simulate the wheel spin gameplay for the individual turn, the secondary game module 116 obtains a set of award probabilities associated with the individual potential rewards (e.g., 10% of chance the wheel stops at a top award, 20% stops at the second top award, and so on). With the obtained award probabilities and the potential awards, the secondary game module 116 may simulate the wheel spin for the individual turn and select an actual award from the potential awards according to the stopping point of the wheel. In some exemplary implementations, the secondary game module 116 may employ a dice function for effectuating such simulation such that the inputs of the dice function are the potential award set and the award probabilities and the output is an actual award.

In response to the selection of the actual award for the individual turn, the secondary game module 116 may be configured to effectuate distribution of the selected actual award to the player engaging in the individual turn. This may involve distributing the actual award to the inventory of the player.

The event module 118 may be configured to run events to facilitate players to compete against each other and/or against AI entities individually or in teams during event periods within the online game. An event period in the online game may be any time period during the instance of the online game. For example, the event period may be a one-hour period, wherein a PvP tournament event may take place within the online game. As another example, the event period may be one or more weeks for a quest and/or any other extended challenges.

The events run by the event module 118 may comprise one or more event objectives. The event objectives may include one or more of player objectives, player-versus-player objectives, player-versus-environment objectives, and collecting and/or harvesting objectives. Player objectives may specify changes in one or more player parameters during the event period. Player-versus-player event objectives may specify total number of kills, defeating other players, obtaining specified virtual items (e.g., such as a virtual item hidden somewhere in the online game), and/or other player-versus-player event objectives. Player-versus-environment objectives may include total number of AI entity kills, defeating one or more specified non-player characters, obtaining specified values of game parameters, and/or other player-versus-environment event objectives. Harvesting objectives may include obtaining a specified amount of a resource by harvesting, gathering, cultivating or other methods for obtaining in-game resources.

In some examples, the event objectives described above may be competitive such that the players participating in the given event are incentivized to achieve the event objective in ways that will defeat other participating players. For example, the players may be incentivized to achieve highest, second highest and so on number of kills during the event, number of victories in PvP activities, number of experience points and/or any other statistical event objective at the end of the event period. In another example, the player may be incentivized to achieve the event objectives in shortest amount of time during the event period (e.g., be the first to find one of 3 rare virtual plants somewhere in the online game), in second shortest amount of time, and so on. For so incentivizing the players, rewards, e.g., such as the rewards determined by the reward module 120 may be announced to the players prior to the given event.

At the end of the event, the event module 118 may be configured to rank the players who participated in the event based on ranking criteria determined by the provider, administrator, moderator, and/or any other administrative entities related to the online game. The ranking criteria may include ranking the participating players based on changes in one or more of the player parameters associated with those players during the event period. Such changes may include the those players' progression in the online game during the event period, a quantity of resources amassed by those players during the event period, a number of competition victories achieved by those players during the event period, a number of relationships established by the individual players within and/or outside of the online game during the event period, a number of virtual items acquired by the individual players during the event period and/or any other achievements by the players in accordance with the event objects described above. For example, in one exemplary event wherein ranking criteria is number of dragon kills, a player with the greatest number of dragon kills at the end of event period may appear higher in the event ranking than a player with less number of dragon kills. It should be appreciated the examples of ranking criteria provided above are merely illustrative. It is understood that the event module 118 may be configured to rank any number of participating players in accordance with however ranking criteria as desired by the provider, administrator, moderator, and/or any other entities related to the online game.

The reward module 120 may be configured to determine rewards for the players participating in the events run by the event module 118 based on the ranks achieved by the players as determined by the event module. In some examples, this may involve dynamically determining for a given player for achieving a given rank at the end of the event period a reward based on the given rank. For example, in a case where a given player achieves a fourth place rank at the end of the event period, a reward may be determined dynamically for the player's achievement of such a rank; and, by comparison, if the given player achieves a second place rank at the end of that event period, a different reward may be determined dynamically by the reward module 120 for rewarding the given player achieving the second place rank; and so on. In some examples, the reward determined by the reward module 120 may be in accordance with one or more reward tables, conversion tables, and/or any other reward schemes predetermined by the provider, administrator, moderator, and/or any other entities related to the online game. For example, a reward table may be predetermined by the provider of the online game to specify different rewards for the first place rank, second place rank, third place rank, and so on.

In some examples, the reward module 120 may be configured to facilitate notification of the reward schemes for a given event prior to the commencement of the given event. For example, a broadcast message may be prepared and sent to the players through game interfaces implemented on the client computing platforms 104 associated with the players to notify of the determined reward scheme.

An individual reward determined by the reward module 120 for a given player for achieving a given rank in an event as determined by the event module may include a quantity of free turns for the given user to play the secondary game. The secondary game may take place concurrently with the given event in the online game, or may take place after the given even in the online game. For example, a reward may be determined by the reward module 120 for a player who achieved a $3^{rd}$ place in the given event such that the reward includes 3 turns for the player to play the secondary game for free. In some examples, the quantity of free turns to be provided to the given player may be determined by the reward module 120 based on the rank achieved by the given player at the end of the event. For example, in some instances, the number of free turns to play the secondary game provided to the players for free may increase along with the ranks of the players. For instance, a first place ranked player may be rewarded with 5 turns to play the secondary game for free; a second place ranked player may be rewarded with 4 turns for free; a third place ranked player may be rewarded with 3 turns for free and so on.

An individual reward determined by the reward module 120 for the given player for achieving a given rank in an event as determined by the event module may include a quantity of optional turns for the given player to play the secondary game in exchange for consideration from the given player. The consideration may include virtual currency, real-world currency, virtual items, play sessions, and/or any other consideration. For example, the reward for the given user may include a quantity of the optional turns to play the secondary game in exchange for certain amount of real-world currency from the user. In another example, such optional turns may be provided to the given player in exchange for the given player's commitment to engage in a number of play sessions; and so on.

In some examples, the reward module 120 may determine a point of time for the given player such that the given player must acquire the optional turns included in the reward by that point of time. By way of a non-limiting example, as illustration only, the reward module 120 may determine that the optional turns may be purchased by the given user during a period immediately after the given event completes and one day before the secondary game takes place within the online game and the given player may not purchase the optional turns after that period. In another example, it may be determined that the optional turns may be purchased by the given player any time before the secondary game completes.

In some examples, the reward module 120 may be configured to facilitate notifying the give player, prior to the point of time by which the given player must acquire the optional turns, that if the given player does not acquire the optional turns to play the secondary game as included in the reward by that point of time, the optional turns will be offered to another player who ranks lower than the given player in the event at the end of the event period in exchange for consideration from that player. For example, the reward module 120 may facilitate generation of a notification through an in-game message to a first place ranked player that he/she has been rewarded 5 turns to play the secondary game for free, and extra 5 operational turns to play the secondary game for purchase and the purchase must be made 1 day prior to the commencement of the secondary game; and if the first place ranked player does not purchase the optional extra 5 turns to play the secondary game by that point of time, the optional 5 turns will be offered to lower ranked players for purchase.

In some examples, features of individual turns rewarded to the players may be determined by the reward module 120. In one example, such features may include prioritized turns such that the turns (i.e., the free and/or optional turns) rewarded to higher ranked players may be have higher priorities for playing the secondary game than those rewarded to lower ranked players. For instance, some of or the entire 5 turns rewarded to the first place ranked player may have the highest priority in the secondary game such that the first place player will play those turns before any other players may play the secondary games. Similarly, some or all of the 4 turns rewarded to the second place ranked player may have second highest priority in the secondary game such that the second place ranked player may play those turns after the first place ranked player has played the highest priority turns and before other players play their turns; and so on.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 112, 114, 116, 118, 120. Processor 108 may be configured to execute modules 112, 114, 116, 118, 120 by software; hardware; firmware; some combination of software, hardware, and/or firmware; and/or other mechanisms for configuring processing capabilities on processor 108.

It should be appreciated that although modules 112, 114, 116, 118, 120 are illustrated in FIG. 1 as being co-located within a single processing unit, in implementations in which processor 108 includes multiple processing units, one or more of modules 112, 114, 116, 118, 120 may be located remotely from the other modules. The description of the functionality provided by the different modules 112, 114, 116, 118, 120 described below is for illustrative purposes, and is not intended to be limiting, as any of modules 112, 114, 116, 118, 120 may provide more or less functionality than is described. For example, one or more of modules 112, 114, 116, 118, 120 may be eliminated, and some or all of its functionality may be provided by other ones of modules 112, 114, 116, 118, 120. As another example, processor 108 may be configured to execute one or more additional modules that may perform some or all of the functionality attributed below to one of modules 112, 114, 116, 118, 120.

Figure 2:
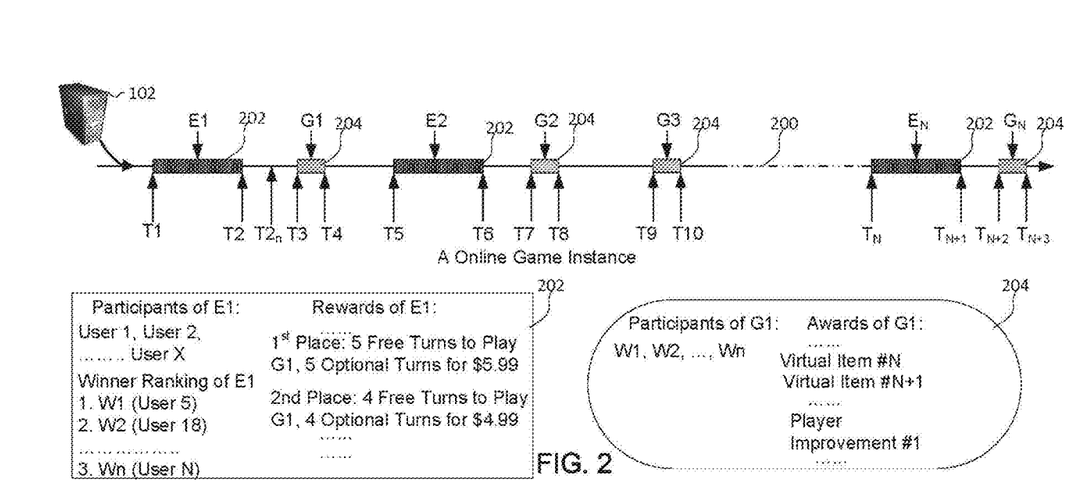
FIG. 2 illustrates one example of using the system shown in FIG. 1 for providing event rewards within an online game.

FIG. 2 illustrates one example of using system 100 shown in FIG. 1 for providing event rewards within an online game. It will be described with references to FIG. 1. As shown in FIG. 2, events 202 (e.g., E1, E2, . . . En) may be run in the instance of the online game provided by the system 100 during different event periods throughout the timeline 200 of the instance of the online game. Also shown in G2 are secondary games 204 (e.g., G1, G2 . . . Gn) that may be provided to facilitate players of the secondary games 204 to take turns to engage in gameplay provided by the secondary games 204 to win awards. It should be appreciated, the temporal relationships between E1, E2, . . . En and G1, G2, . . . Gn illustrated in FIG. 2 are merely illustrative and thus not intended to be limiting. The temporal relationships between E1, E2, ... En and G1, G2, ... Gn may vary in other examples. For example, G2 may be provided in the online game concurrently with E2, and G1 may last for the entire period of the online game instance.

In any case, as shown in this example, the events 202 and the secondary games 204 may run for periods that are associated with starting points (e.g., T1, T3, T5, T7, T9, ... Tn, Tn+2) and end points (e.g., T2, T4, T6, T8 ... Tn−1, Tn+3). For an individual event 202, rewards for participating players may be provided based on the ranks achieved by those players at the end of the event period of the individual event 202. Illustrated in FIG. 2 is a ranking of players who participated in the event E1 at the end of the event period of E1 (i.e., at T2). As also shown, rewards that include a quantity of free turns for the ranked players (e.g. W1, W2 ..., Wn) may be determined. As illustrated, the rewards for E1 may include a number of free turns to play the secondary game G1 based on the player ranks at T2 and a number of optional turns to play G1 also based on the player ranks at T2. Also illustrated in this example is that a number of awards may be provided by G1 to the participants of G1 (i.e., the ranked players of E1—W1, W2, ... Wn). As shown, the awards provided by G1 may include virtual items (e.g., premium items highly sought after in the online game, items that may augment and/or enhance the items rewarded by events 202, and/or any other virtual items), and improvements to player parameters within the online game.

Figure 3:
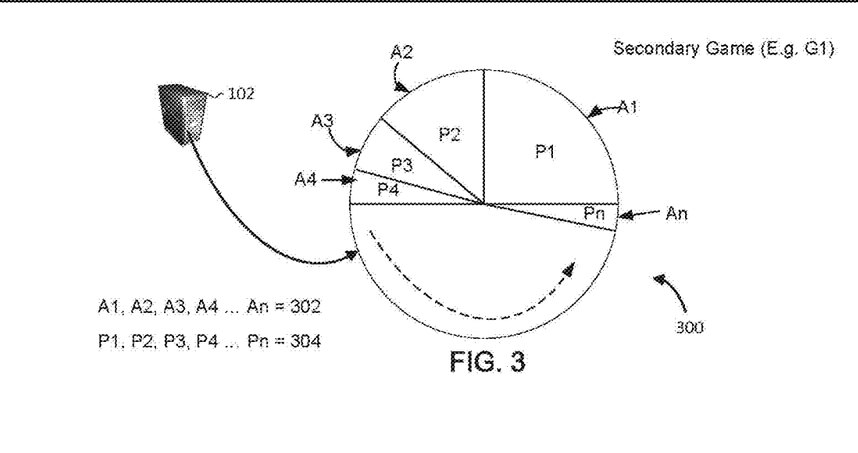
FIG. 3 illustrates an example of a secondary game provided by the system shown in FIG. 1.

FIG. 3 illustrates an example of a secondary game provided by the system 100 shown in FIG. 1. It will be described with references to FIGS. 1-2. As shown in this example, the secondary game 300 implemented by server 102 (e.g., via a secondary game module) may provide a set of potential rewards 302 (e.g., A1, A2, A3, A4 ... An). As also shown, the individual ones of the potential rewards 302 may be associated with award probabilities by which an actual award may be selected in an individual turn of the secondary game 300.

Figure 4:
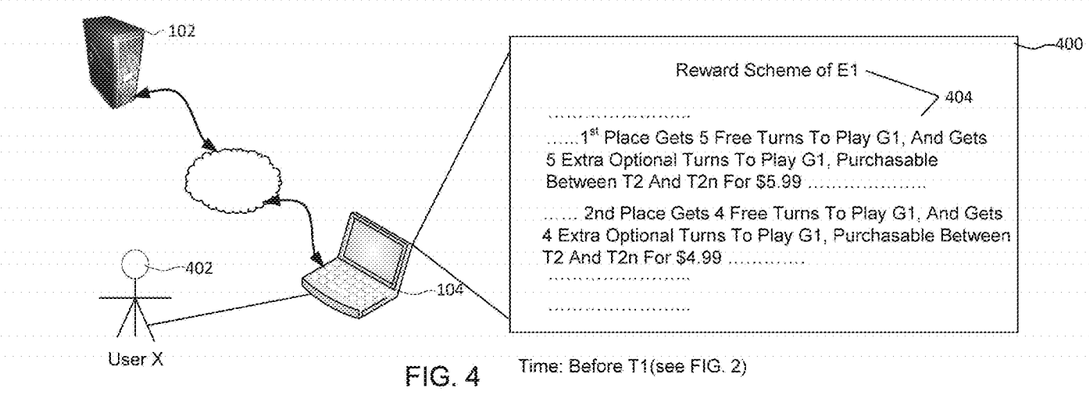
FIG. 4 illustrates an example of using the system shown in FIG. 1 to notify the players of the online game a reward scheme of an event prior to the commencement of the event.

FIG. 4 illustrates an example of using the system 100 shown in FIG. 1 to notify the players of the online game a reward scheme of an event prior to the commencement of the event. It will be described with references to FIGS. 1-3. As shown in this example, a notification 404 may be presented in an interface 400 implemented on the client computing platform 104 associated with a given user X 402 before the commencement of event E1 shown in FIG. 2. As illustrated, the notification 404 may notify the given user X 402 that free turns to play secondary game G1 may be provided to the participants of E1 based on their ranks at the end of E1. As also illustrated, the notification 404 may notify the given user X 402 that optional turns to play the secondary game G1 may be purchased as a part of the rewards of E1.

Figure 5:
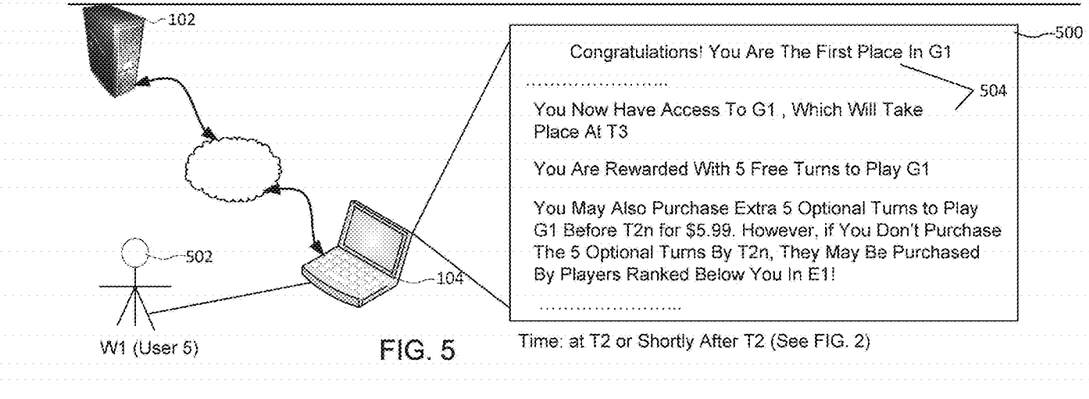
FIG. 5 illustrates an example of using system shown in FIG. 1 to notify a player who achieves a rank at the end of an event period of an event about the free turns and optional turns to play a secondary game being rewarded to the player.

FIG. 5 illustrates an example of using system 100 shown in FIG. 1 to notify a player who achieves a rank at the end of an event period of an event about free turns and optional turns to play a secondary game being rewarded to the player. It will be described with references to FIGS. 1-4. As illustrated, notification 504 may be presented to a ranked player of E1, e.g., W1 (User 5) 502 (also described in FIG. 2), in an interface 500 implemented on client computing platform 104 associated with the W1 502 at or shortly after the end of E1 (i.e., T2 as shown in FIG. 2). As illustrated, W1 is notified by notification 504 that W1 has won 5 free turns to play G1 and may purchase 5 extra turns to play G1 for $5.99 before T2n (i.e., some point of time before commencement of G1 as shown in FIG. 2). As also illustrated, the notification 504 also notifies W1 502 that if W1 does not purchase the optional turns before T2n, then the optional turns will be offered to other lower ranked players in E1.

Figure 6:
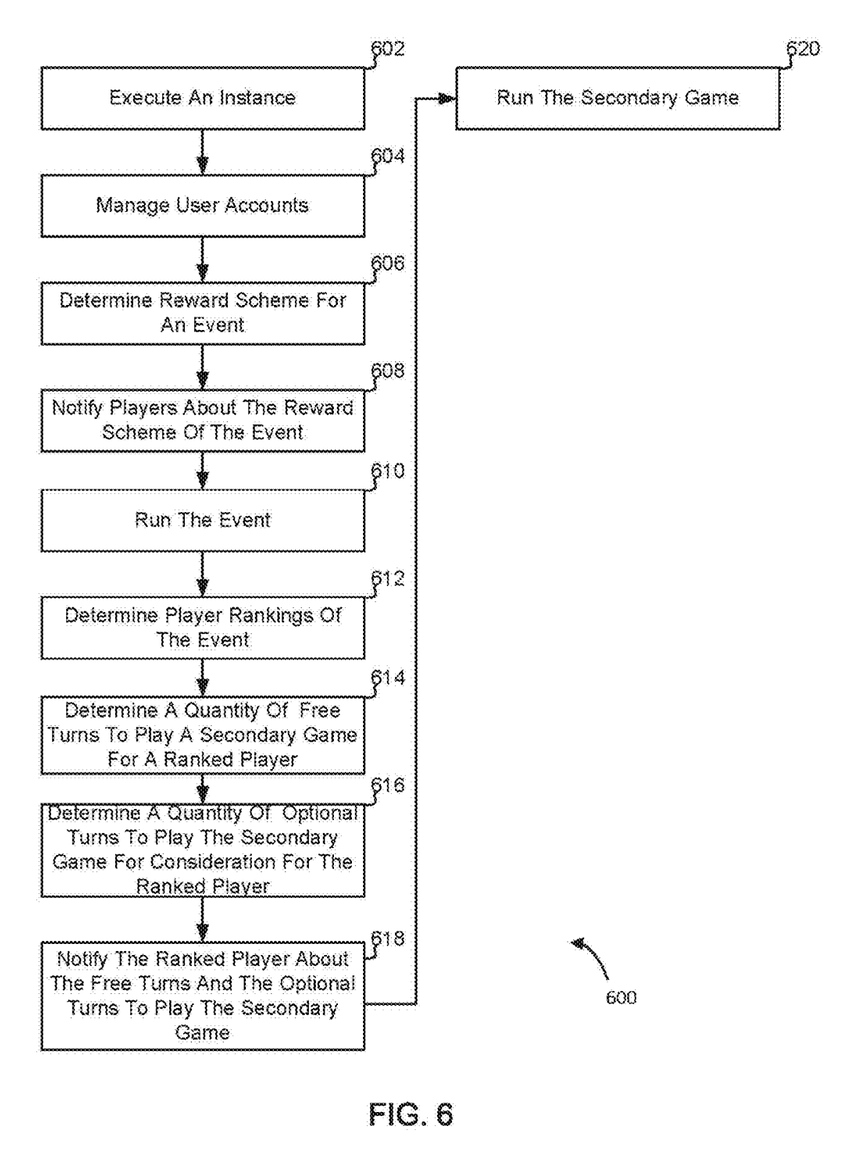
FIG. 6 illustrates one exemplary method for providing event rewards within an online game in accordance with the disclosure.

FIG. 6 illustrates one exemplary method 600 for in accordance with the disclosure. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, an instance of an online game may be executed and implemented to determine view information for transmission to one or more client computing platforms associated with players. The players may interact with the online game by initiating online game commands to perform user actions. The user actions may be executed in the online game. In some implementations, operation 602 may be performed by a space module the same as or similar to game module 112 (shown in FIG. 1 and described herein).

At an operation 604, player accounts associated with the players may be managed. The user accounts may include a first account associated with a first player. The first account may include a set of player parameters associated with the first player. In some implementations, operation 604 may be performed by a user module the same as or similar to user module 114 (shown in FIG. 1 and described herein).

At an operation 606, a reward scheme of for an event within the online game may be determined. The reward scheme may specify rewards that may be provided to players who achieve ranks at the end of the event period of the event. The rewards may include a quantity of free turns to play a secondary game, a quantity of optional turns to the play the secondary game for purchase, and/or other reward features based on the player ranks achieved at the end of the event period of the event. In some implementations, operation 606 may be performed by a reward module the same as or similar to reward module 120 (shown in FIG. 1 and described herein).

At an operation 608, the reward scheme determined in operation 610 may be notified to the players. Such a notification may be provided to the players prior to the commencement of the event. In some implementations, operation 608 may be performed by an event module the same as or similar to event module 118 (shown in FIG. 1 and described herein).

At an operation 610, the event may be run within the online game. The event may be run for an event period. Event objectives may be established for the event. During the event period of the event, players may compete with or against each other individually or in teams achieve towards the event objectives. In some implementations, operation 610 may be performed by an event module the same as or similar to event module 118 (shown in FIG. 1 and described herein).

At an operation 612, player rankings in the event run in operation 610 may be determined at the end of the event period of the event. The player rankings may be determined based on ranking criteria, which may include changes in one or more player parameters during the event period of the event. Based on such ranking criteria, a given player may be determined to achieve a given rank in the event at the end of the event period. In some implementations, operation 612 may be performed by an event module the same as or similar to event module 118 (shown in FIG. 1 and described herein).

At an operation 614, a quantity of free turns to play the secondary game may be determined for the given player based on the given rank achieved by the given player at the end of the event period as determined in operation 612. In some implementations, operation 614 may be performed by a reward module the same as or similar to reward module 120 (shown in FIG. 1 and described herein).

At operation 616, a quantity of optional turns to play the secondary game in exchange for consideration from the given player may be determined for the given player based on the given rank achieved by the given player at the end of the event period as determined in operation 612. The consideration may include virtual currency and/or real-world currency from the given player. In some implementations, operation 616 may be performed by a reward module the same as or similar to reward module 120 (shown in FIG. 1 and described herein).

At operation 618, the given user may be notified about the free turns and the operational turns determined in operations 614 and 616 respectively. In some examples, the notification may notify the given player that the given player must acquire the optional turns to play the secondary game as included in the reward by a point of time (e.g., before the commencement of the secondary game within the online game) or else the optional turns will be offered to lower ranked players in the event for purchase. In some implementations, operation 618 may be performed by a reward module the same as or similar to reward module 120 (shown in FIG. 1 and described herein).

At operation 620, the secondary game may be run. In some implementations, operation 620 may be performed by a secondary game module the same as or similar to reward module secondary game module 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for rewarding players participating in events within an online game, the system comprising one or more processors configured by machine-readable instructions to:

execute an instance of online game, to implement the instance of the online game by receiving commands over a network from client computing platforms and executing the commands in the instance of the online game to facilitate player participation in the online game, and to facilitate presentation of the online game on the client computing platforms by causing displays associated with the client computing platforms to present views of the online game;

manage player accounts associated with individual players of the online game, the individual player accounts containing player parameters, wherein the player accounts include a first player account associated with a first player, the first player account containing a first set of player parameters associated with the first player;

selectively provide access to the players of a secondary game to facilitate player turns in the secondary game, and for an individual turn in the secondary game, to:

obtain a set of potential awards and a set of award probabilities for the set of potential awards, the individual awards including virtual items usable in the online game;

stochastically or quasi-stochastically, select one of the potential awards as an actual award for distribution based on the award probabilities; and effectuate distribution of the actual award in the online game;

run events within the online game, wherein the events include a first event that runs for a first event period;

rank the players based on changes in one or more of the player parameters during the first event period such that the first player achieves a first rank at the end of the first event period; and determine rewards for the players for the events run based on the ranks achieved by the players as determined such that a first reward is determined for the first player for achieving the first rank at the end of the first event period, the first reward including a first quantity of player turns of the secondary game to be provided to the first player for free and a second quantity of player turns of the secondary game to be provided to the first player in exchange for consideration from the first player, whereby access to turns of the secondary game for the first player are limited to the first quantity and the second quantity.

2. The system of claim 1, wherein the one or more processors are further configured by machine-readable instructions:

such that the player accounts include a second player account associated with a second player;

such that the second player achieves a second rank at the end of the first event period, the second rank being higher than the first rank; and to determine a second reward for the second player for achieving the second rank at the end of the first event period, the second reward including a third quantity of turns of the secondary game to be provided to the second player for free and a fourth quantity of turns of the secondary game to be provided to the second player in exchange for consideration from the second player, whereby the third quantity is greater than the first quantity and the fourth quantity is greater than the second quantity, and access to turns of the secondary game for the second player is limited to the third quantity and the fourth quantity.

3. The system of claim 1, wherein the one or more processors are further configured by machine-readable instructions such that the second quantity of player turns of the secondary game as included in the first reward is provided to the first player in exchange for virtual currency and/or real currency of the first player.

4. The system of claim 1, wherein the one or more processors are s further configured by machine-readable instructions to determine a point of time by which the first player must acquire the second quantity of player turns of the secondary game as included in the first reward.

5. The system of claim 4, wherein the point of time is between the end of first event period and the beginning of a second event.

6. The system of claim 4, wherein the one or more processors are further configured by machine-readable instructions to facilitate a notification, prior to the point of time, notifying the first player that if the first player does not acquire the second quantity of player turns as included in the first reward by the point of time, the second quantity of player turns of the secondary game will be provided to another player who ranks lower than the first player in the first event at the end of the first event period in exchange for consideration from that player.

7. The system of claim 1, wherein one or more processors are further configured by machine-readable instructions such that the determination of the first reward includes an examination of a reward table specifying that the first reward is to be provided to the player who achieves the first rank in the first event at the end of the first even period, the one or more processors are being further configured by machine-readable instructions to notify the players of the online game about the reward table prior to the commencement of the first event period.

8. The system of claim 1, wherein the one or more processors are is further configured by machine-readable instructions such that the set of potential awards include improvements to player parameters.

9. The system of claim 1, wherein the one or more processors are further configured by machine-readable instructions such that the changes in one or more of the player parameters based on which the individual players are ranked include individual players progression in the online game during the first event period, a quantity of resources amassed by the individual players within the online game during the first event period, a number of competition victories achieved by the individual players within the online game during the first event period, a number of relationships established by the individual players within and/or outside of the online game during the first event period, and/or a number of virtual items acquired by the individual players during the first event period.

10. A method for rewarding players participating in events within an online game, the method being executed in one or more physical processors configured by machine-readable instructions, the method comprising:

executing an instance of online game, implementing the instance of the online game by receiving commands over a network from client computing platforms and executing the commands in the instance of the online game to facilitate player participation in the online game, and facilitating presentation of the online game on the client computing platforms by causing displays associated with the client computing platforms to present views of the online game;

managing player accounts associated with individual players of the online game, the individual player accounts containing player parameters, wherein the player accounts include a first player account associated with a first player, the first player account containing a first set of player parameters associated with the first player;

selectively providing access to the players of a secondary game to facilitate player turns in the secondary game, wherein, for an individual turn in the secondary game:
obtaining a set of potential awards and a set of award probabilities for the set of potential awards, the individual awards including virtual items usable in the online game;
stochastically or quasi-stochastically, selecting one of the potential awards as an actual award for distribution based on the award probabilities; and
effectuating distribution of the actual award in the online game;

running events within the online game, wherein the events include a first event that runs for a first event period, ranking the players based on changes in one or more of the player parameters during the first event period such that the first player achieves a first rank at the end of the first event period; and determining rewards for the players for the events based on the ranks achieved by the players such that determining a first reward for the first player for achieving the first rank at the end of the first event period, the first reward including a first quantity of player turns of the secondary game to be provided to the first player for free and a second quantity of player turns of the secondary game to be provided to the first player in exchange for consideration from the first player, whereby access to turns of the secondary game for the first player are limited to the first quantity and the second quantity.

11. The method of claim 10, further comprising:
managing a second player account associated with a second player;
determining that the second player achieves a second rank at the end of the first event period, the second rank being higher than the first rank; and
determining a second reward for the second player for achieving the second rank at the end of the first event period, the second reward including a third quantity of turns of the secondary game to be provided to the second player for free and a fourth quantity of turns of the secondary game to be provided to the second player in exchange for consideration from the second player, whereby the third quantity is greater than the first quantity and the fourth quantity is greater than the second quantity, and access to turns of the secondary game for the second player is limited to the third quantity and the fourth quantity.

12. The method of claim 10, wherein the second quantity of player turns of the secondary game as included in the first reward is provided to the first player in exchange for virtual currency and/or real currency of the first player.

13. The method of claim 10, further comprising determining a point of time by which the first player must acquire the second quantity of player turns of the secondary game as included in the first reward.

14. The method of claim 13, wherein the point of time is between the end of first event period and the beginning of a second event.

15. The method of claim 10, further comprising facilitating a notification, prior to the point of time, notifying the first player that if the first player does not acquire the second quantity of player turns as included in the first reward by the point of time, the second quantity of player turns of the secondary game will be provided to another player who ranks lower than the first player in the first event at the end of the first event period in exchange for consideration from that player.

16. The method of claim 10, wherein the determination of the first reward includes an examination of a reward table specifying that the first reward is to be provided to the player who achieves the first rank in the first event at the end of the first even period, and wherein the method further comprises notifying the players of the online game about the reward table prior to the commencement of the first event period.

17. The method of claim 10, wherein the set of potential awards include improvements to player parameters.

18. The method of claim 10, wherein the changes in one or more of the player parameters based on which the individual players are ranked include individual players progression in the online game during the first event period, a quantity of resources amassed by the individual players within the online game during the first event period, a number of competition victories achieved by the individual players within the online game during the first event period, a number of relationships established by the individual players within and/or outside of the online game during the first event period, and/or a number of virtual items acquired by the individual players during the first event period.

* * * * *